Figure 1:
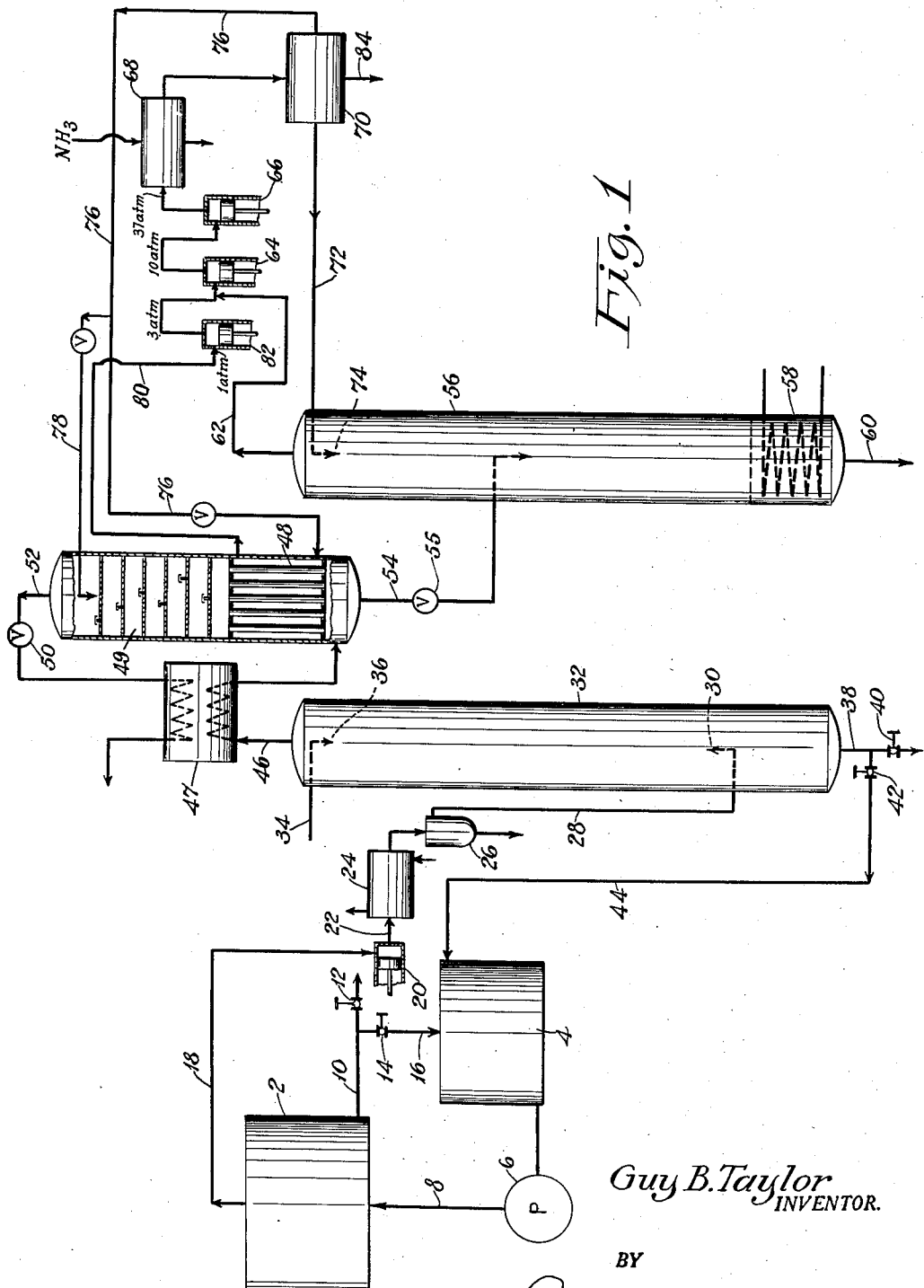

April 1, 1941. G. B. TAYLOR 2,236,978
MANUFACTURE OF ACETYLENE
Filed June 10, 1938 2 Sheets-Sheet 1

Guy B. Taylor
INVENTOR.
BY
George W. Walker ATTORNEY.

April 1, 1941. G. B. TAYLOR 2,236,978
MANUFACTURE OF ACETYLENE
Filed June 10, 1938 2 Sheets-Sheet 2

Guy B. Taylor
INVENTOR.
BY
George W. Walker ATTORNEY.

Patented Apr. 1, 1941

2,236,978

UNITED STATES PATENT OFFICE 2,236,978

MANUFACTURE OF ACETYLENE

Guy B. Taylor, Wilmington, Del., assignor to E. I. du Pont de Nemours & Company, Wilmington, Del., a corporation of Delaware Application June 10, 1938, Serial No. 212,911

4 Claims. (Cl. 260—679)

This invention relates to the preparation and recovery of acetylene, and more particularly to the preparation of acetylene together with hydrocarbons boiling above and below acetylene and with hydrogen, and the recovery of acetylene from said normally gaseous mixture.

Until recently all acetylene was manufactured from calcium carbide, but its use for chemical synthesis has created such a demand for acetylene that attempts have been made to obtain it from other sources. Most of these attempts have been in the field of high temperature cracking of gaseous or liquid hydrocarbons. The gas produced by this cracking consists chiefly of hydrogen and acetylene but contains in addition hydrocarbons boiling above and below acetylene. These hydrocarbons are mostly unsaturated and comprise chiefly ethylene, propylene, butylenes, methyl acetylene, and diacetylene. By the invention described herein there is obtained an improved yield in acetylene in the cracking reaction as well as the separation of highly concentrated acetylene from admixture with the other gaseous products. Heretofore no complete method was known for the removal of all of the hydrocarbon impurities and at the same time separating the acetylene gas from the hydrogen.

This invention has as its object the manufacture and recovery of concentrated acetylene. A further object is the recovery of acetylene from admixture with other gases. Another object is the production of concentrated acetylene by removing same from admixture with other hydrocarbons and hydrogen. Another object is the manufacture and concentration of acetylene from gaseous products obtained by cracking hydrocarbon oils at temperatures such as are obtainable in the electric arc. Still another object is the starting of a fractionation column for the separation of acetylene from gases boiling below acetylene. Another object is to improve the hydrocarbon mixture which is cracked to supply the acetylene gas. Other objects will appear hereinafter.

These objects are accomplished by the following invention which comprises cracking a hydrocarbon oil at temperatures such as are obtainable by the electric arc and under conditions which will cause the production of acetylene, scrubbing the gas so produced with a hydrocarbon oil and thereby removing those hydrocarbons boiling above acetylene, then treating the resulting gaseous mixture under conditions which will cause the separation of the acetylene from the more volatile gases. This latter step may include rectifying the gaseous mixture under conditions which will cause the separation of acetylene as a liquid and the more volatile fraction as a gas. This fractionation step may be started by operating the fractionating column at the temperature conditions required by first introducing a gaseous mixture comparable to the acetylene gaseous mixture to be rectified except that the acetylene is replaced with ethane until rectification conditions are established, then substituting acetylene for the ethane and thereby establishing conditions of rectification that will effect the necessary separation of acetylene from the more volatile gas. The hydrocarbon oil from the scrubbing step together with the tails dissolved therein may be used in whole or in part as the cracking stock for furnishing the acetylene containing gases.

For the purpose of simplifying the terminology used herein and in the claims, the components more volatile than acetylene will be termed the "heads" and the components less volatile than acetylene will be termed the "tails."

Figure 2:
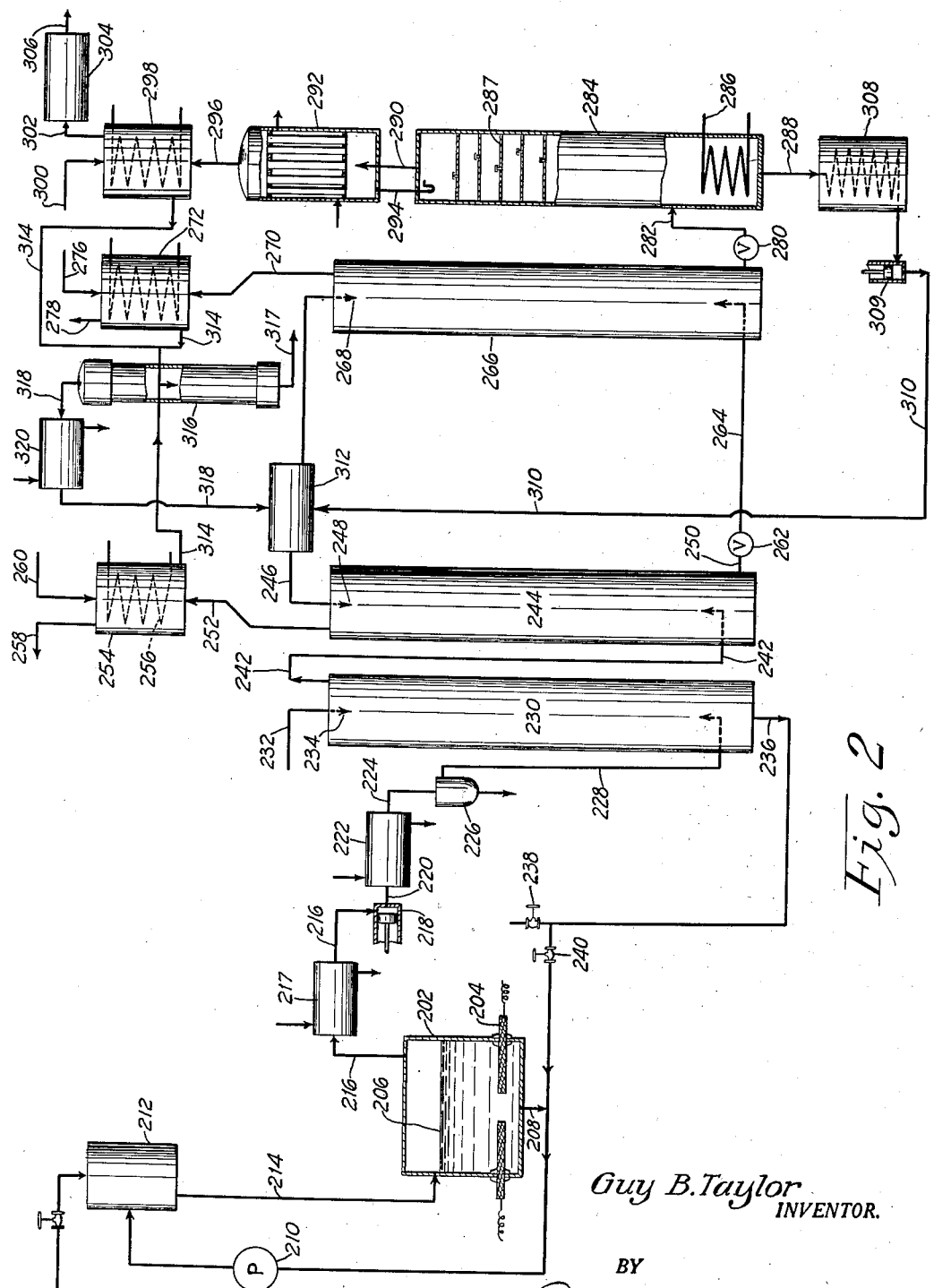

Figure 1 is a diagrammatical drawing of one modification of an apparatus and process for carrying out the invention. Figure 2 is a diagrammatical drawing of another modification of an apparatus and process for carrying out the invention.

In order to properly illustrate this invention the following detailed descriptions are given herein. These descriptions are not to be considered as limiting said invention in any respect.

Referring to Figure 1 of the drawings, the crude gas is generated by cracking a hydrocarbon oil at temperatures and other conditions conducive for the production of acetylene in the cracking process 2. The oil used in the cracking operation is introduced into the cracking process from the oil storage 4 via pump 6 and conduit 8. Products of the cracking reaction other than the gas, together with the uncracked oil, may be returned to the oil storage 4 via conduit 10, valve 14, and conduit 16 or may be withdrawn from the system by closing valve 14 and opening valve 12.

The crude gas generated in the cracking step is withdrawn via conduit 18 and introduced into compressor 20 where its pressure is increased to about 11 atmospheres absolute. From compressor 20 the gas is discharged through conduit 22 which passes through cooler 24 where the heat of compression is removed; thence to trap 26.

In trap 26 condensed liquids are separated from the crude gas. The gas mixture leaves trap 26 via conduit 28 and passes into the bottom of scrubber 32 through inlet 30. Hydrocarbon oil is introduced into the top of the oil scrubber via conduit 34 and spray 36. The oil is non-selective for the absorption of acetylene and therefore dissolves out the tails from the incoming gas. The oil with the tails dissolved therein is removed from the oil scrubber 32 via conduit 38 from whence it may be withdrawn from the system by closing valve 42 and by opening valve 40 or by the opposite procedure of closing valve 40 and opening valve 42, the oil may be returned to oil storage.

The oil with the tails contained therein may be passed by conduit 44 into the oil storage tank 4 for use in cracking. This oil, rich in tails, was found to be exceptionally fine cracking stock as the tails furnished additional source of raw material for the production of acetylene. The recycling of the tails to the cracking system did not cause a building up of these components in the system but rather furnished an increased yield of acetylene in proportion to the oil consumed.

The fraction containing the heads and the acetylene is conducted from the top of the oil scrubber 32 via conduit 46 through the heat exchanger 47 into a backward return condenser 48, operated at substantially the same pressure as the oil scrubber 32. This heat exchanger 47 cools the high pressure gas to about −30° C. to about −60° C. This cooling may be produced by the introduction of heads leaving valve 50 into said heat exchanger, or by the use of the acetylene from column 56 via pipe 60, or by some other refrigerant. This backward return condenser has several bubble cap plates located above the condensing section. The condenser is cooled by expanding liquid ethylene from conduit 76 into the condenser shell where it is evaporated under a pressure of one atmosphere. The ethylene vapor produced by this evaporation passes through conduit 80 to the first stage 82 of the ethylene compressor where it is compressed to three atmospheres and combined with the vapors issuing from the fractionating column 56.

The evaporation of ethylene in the backward return condenser shell 48 produces a temperature of about −103° C. This is sufficient to cool the high pressure gas rising through the tubes to a temperature of about −100° C. At this temperature the high pressure gas enters the rectifying section 49 where it is further cooled by direct contact with a counter-current flow of liquid ethylene. This liquid ethylene is expanded into the top of the rectifying section 49 via conduit 78. The evaporation of this ethylene produces a temperature of approximately −106° C. at the top of the rectifying section 49. This liquid ethylene causes the condensation of acetylene and ethylene from the gaseous fraction. The uncondensed heads pass from the rectifying section 49 via conduit 52 and valve 50 and thence out of the system.

The acetylene-ethylene condensate produced at the base of the backward return condenser 48 is removed via conduit 54 through expansion valve 55 and thence into the rectifying column 56. The expansion valve 55 operates to reduce the pressure to approximately three atmospheres absolute. Rectifying column 56 is operated by heating the liquid in the calandria 58 to a temperature of approximately −60° C. and by introducing liquid ethylene into the top of said column via conduit 72 and spray 74. This liquid ethylene boils at a temperature of approximately −80° C. Under these conditions it is possible to maintain a liquid mixture of ethylene and acetylene throughout the column and separate substantially pure acetylene as a liquid at the bottom of the column, said acetylene being removed via conduit 60.

The ethylene containing approximately 1% of heads, which were not removed by the condenser 48 and rectifying section 49, is removed from column 56 via conduit 62 and is introduced together with ethylene from compressor 82 into the second stage 64 of the ethylene three-stage compressor. This second stage compresses the ethylene from about three atmospheres absolute to an intermediate pressure of about 10 atmospheres absolute, and thence passes the compressed gases through a third stage 66 where the pressure is increased to about 37 atmospheres absolute. From the third stage 66 the compressed gases are passed through the ammonia cooler 68 where they are liquefied and delivered to the ethylene receiver 70.

Ethylene building up in the ethylene circulation system is withdrawn from the receiver by conduit 84. Due to the extreme difficulty in separating the last traces of acetylene from the ethylene vapor leaving the top of the rectifying column 56, this ethylene fraction always contains a small quantity of acetylene; however, the production of 99+ % acetylene at the base of the rectifying column 56 is consistently attained.

The gases comprising acetylene and the heads issuing from the original scrubber 32 via conduit 46 may be rectified directly without first condensing an ethylene-acetylene mixture. Such a rectification step is operated at approximately the same pressure as the oil scrubbing step by cooling to a temperature of −100° C. so as to furnish reflux liquors in the column and by heating at the base of the column to approximately −28° C. so as to completely remove the heads from the acetylene. Under these conditions pure acetylene is obtained; however, the single stage rectification has not proven as economical as the method disclosed in Figure 1.

The separation of acetylene as a liquid fraction by rectification from gases containing considerable hydrogen and/or other gases boiling below acetylene offers considerable difficulty because acetylene freezes at −81° C. and the solid has a vapor pressure of one atmosphere at −84° C. The coldest point in a rectifying column designed to deliver pure liquid acetylene at the base by operating under rectifying conditions will be in a refrigerated reflux condenser at the top. The starting of such a column, as well as its operation, presents a difficulty because if the temperature of the coldest point is chosen above the freezing point of acetylene, the pressure required to avoid serious losses of acetylene becomes very high so that it is necessary to operate in the pressure range where acetylene gas is an explosion hazard. Such a column must be operated at some point below the freezing point of acetylene to maintain a safe partial pressure of acetylene. It was found that in this pressure range it is not practicable to separate pure acetylene at all unless the crude gas mixture contained ethylene. When ethylene is present, then liquid mixtures of acetylene and ethylene can be condensed under rectifying conditions at temperatures below the freezing point of acetylene. But even 50% ethylene in acetylene freezes around −90°, so that starting a column by simply introducing the gas under operating conditions will plug it with solid frozen gases before the required liquid-composition concentration gradient can be established.

The present invention is therefore concerned with methods of starting a rectification column designed to separate pure liquid acetylene from mixtures with ethylene and lower boiling gases.

A gas mixture comprising the major constituents in substantially the same ratio as contained in the crude acetylene gas, with the exception that ethane is substituted for acetylene, is used to start the column. As soon as the column begins to separate pure liquid ethane at the bottom, then ethane in the incoming gas is gradually replaced by acetylene until the gas mixture becomes of the same composition as that of the crude gas. Then crude gas can be substituted for the synthesized composition.

As a specific example of this method a gas containing 36% $C_2H_6$, 8% $C_2H_4$, and rest substantially hydrogen was compressed to 150 pounds per square inch gage pressure, cooled to $-60°$ C. and introduced to the middle of a column. The top of the column was cooled to $-100°$ C., rectifying conditions were established, and liquid ethane boiling at $-33°$ drawn from the bottom of the column. Then crude acetylene gas generated by operating an electric arc under oil and from which the tails had been removed was gradually substituted for the synthetic mixture. This gas contained 28% to 30% $C_2H_2$, 8% $C_2H_4$, 5% $CH_4$, and the rest substantially hydrogen. Eventually pure acetylene was delivered from the bottom of the column without any significant changes in temperature at any point in it. Previous attempts to start the column under the same conditions without using the synthetic mixture had always resulted in blocking by freeze-up in the condenser.

Another variation of this invention is shown by the process as illustrated in Figure 2. A crude gas is generated by operating in a cracking chamber 202 an electric arc 204 submerged in hydrocarbon oil 206. This hydrocarbon oil is recirculated through the arc by withdrawing same via conduit 208 through circulating pump 210 to the oil storage 212 and thence back to the arc through conduit 214.

The cracked crude gas is withdrawn from the cracking chamber 202 via conduit 216 through an alumina gel drier 217 and thence to compressor 218 where it is compressed to approximately 11 atmospheres absolute. The crude gas under pressure leaves the compressor 218 via conduit 220, passing through cooler 222 and thence via conduit 224 to trap 226.

In trap 226 any condensed liquid contained in the gas is removed. At this point the crude gas has approximately the following composition:

| | Per cent |
|---|---|
| Hydrogen | 52.7 |
| Methane | 6.0 |
| Ethylene | 6.0 |
| Acetylene | 28.0 |
| Propylene | 1.2 |
| Methyl acetylene | 1.2 |
| Butylenes | 1.2 |
| Diacetylene | 2.5 |
| Other hydrocarbons | 1.2 |

The gas mixture then passes from trap 226 through conduit 228 into the bottom of the oil scrubber 230. Hydrocarbon oil is admitted into the top of the oil scrubber via conduit 232 and spray 234. This oil is non-selective for the absorption of acetylene and therefore dissolves out the tails of the incoming gas. The heads together with the acetylene are conducted from the oil scrubber 230 via conduit 242.

The hydrocarbon oil with the tails dissolved therein is removed from the oil scrubber 230 via conduit 236 and thence to the oil storage 212 by closing valve 238 and opening valve 240. If this oil is not needed or it is not desired to use same, it may be removed from the system by closing valve 240 and opening valve 238.

The acetylene and head mixture then pass via conduit 242 into the acetone scrubber 244 where the gaseous fraction ascends against descending liquid acetone. The acetone dissolves the acetylene contained in the gas and is removed from the bottom of the scrubber via conduit 250. Fresh acetone is introduced into the top of the scrubber via conduit 246 and spray 248. The gas fraction not dissolved by the acetone is drawn off via conduit 252 and as this fraction contains considerable quantity of acetone vapor, it is introduced into the cooler and water scrubber 254 which removes the acetone from the heads. The heads are then withdrawn from the system via conduit 256. Water is introduced into the water-scrubber via conduit 260 and the water-acetone mixture is withdrawn from the water scrubber 314.

The acetone-acetylene solution removed from the acetone scrubber 244 via conduit 250 then passes through the expansion valve 262, where the pressure is reduced to approximately two atmospheres absolute, and thence through conduit 264 into the lower part of the second acetone scrubber 266. In this second acetone scrubber any gases less soluble in acetone than acetylene are outgassed and under the scrubbing action of additional acetone admitted through spray 268 are washed free of outgassed acetylene. The less soluble gaseous fraction is then removed from the acetone scrubber 266 via conduit 270 and the acetone vapors contained therein are recovered in the cooler scrubber apparatus 272 in a manner similar to those recovered from a gaseous fraction withdrawn via conduit 252 from the first acetone scrubber 244.

The purified acetylene-acetone solution from the second acetone scrubber 266 is withdrawn via conduit 282, and passes through expansion valve 280 where the pressure is reduced to one atmosphere. At this pressure the acetone-acetylene solution is introduced into boiler 284 where it is boiled by passing steam through coil 286. Under these conditions the acetylene is expelled from the acetone and pure acetone is removed from the bottom of the boiler via conduit 288.

The acetylene gases containing acetone vapor pass through the rectifying section 287 located in the upper portion of the boiler and from there, through conduit 290, pass into the backward return condenser 292 where reflux conditions are maintained that will condense the acetone. The acetone so condensed is returned to the boiler via conduit 294.

From the backward return condenser 292 the acetylene, still containing some acetone, passes through the water scrubber 298 via conduit 296 which operates in a manner similar to the water scrubbers 254 and 272. The wet acetylene gas free from acetone is withdrawn from water scrubber 298 via conduit 302 and passes through drier 304; thence to the acetylene storage via conduit 306.

The acetone from the boiler 284 is cooled by water cooler 308 and then by means of pump 309, is returned to the acetone supply storage 312 via conduit 310.

The water-acetone solutions from each of the three water scrubbers are conducted via branching conduit 314 to the acetone still 316. This still separates the water as a liquid from acetone as a gas, the water being withdrawn from the bottom of the still via conduit 317. The acetone vapor is withdrawn from the top of the still via conduit 318, passing through cooler 320 where it is liquefied and returned to the acetone supply storage 312.

As the drawings are purely diagrammatical, the equivalents of the various pieces of apparatus shown may be used. For example the compressor 20 in Figure 1 is shown as a single stage compressor. It is not intended that the process and apparatus be so limited. The figure in the drawings merely represents the function of compressing the gases. When the incoming gas from the cracking process is at about atmospheric pressure and the pressure must be increased to 11 atmospheres, a two or three-stage compressor would be required with water coolers between each stage. Similar type changes can be made in the other pieces of apparatus without departing from the spirit of the invention. Such flanges are within the skill of those versed in the art.

This invention is not limited to the separation of gaseous mixtures of the composition disclosed or from the source disclosed. The invention is applicable to the separation of acetylene from any mixture of gases boiling above and below acetylene. The crude gas may be obtained from any source. Thus the oil trap 26 in Figure 1 may be omitted if the incoming gas does not contain high boiling constituents. A particular feature of this invention, however, is the use of the oil after it has absorbed the tails from the gas mixture as a source of raw material for the production of the crude gas. The oil used for absorbing the tails may be any hydrocarbon oil having an average molecular weight above about 100, and preferably a fuel oil. The same can be said of the oil used for cracking. The cracking oil need not be composed wholly of the scrubbing oil plus the tails and, in so far as certain phases of this invention are concerned, this invention, as explained above, is not limited in any respect to the source of the raw material.

Solvents other than acetone may be used for scrubbing out the acetylene from the gas containing acetylene and lower boiling constituents. Any solvent having a high selective solubility coefficient for acetylene may be used. The water scrubbers and the acetylene recovery system including the rectifying column 316 may be dispensed with if the scrubbing solvent used is relatively non-volatile and inexpensive. The recovery system will of course depend upon the solvent used. The second acetone scrubber 266 may be omitted if the gaseous constituents boiling below acetylene are such that they are not dissolved in the scrubbing solution. The scrubbing solution containing the acetylene gas may be outgassed in any manner such as by heating or reducing the pressure thereon, or both as shown in the preferred embodiment of the invention. The steps of scrubbing with water and drying the acetylene vapors may or may not be used, depending on the type of solvent selected.

While it is preferable to operate the oil scrubbing step for the removal of the tails at a pressure of about 11 atmospheres, pressures between one atmosphere and the maximum pressure at which it is safe to operate the apparatus may be used. Pressures lower than atmospheric might be used but are of course of no advantage. It is therefore evident that pressure is not a critical factor in the operation of this step.

In the modification of separating the acetylene from the heads by distillation as shown in Figure 1, column 56, it is preferred from the standpoint of safety to operate at a pressure between about 1 or 1⅓ atmospheres absolute and about 6 atmospheres absolute, but higher pressures may be used if desired. The cooling at the top of the rectifying column need not be produced by a direct spray of liquid ethylene although this is the preferred method.

The initial condensation and rectification as carried out in the condensing and rectifying sections 48 and 49 of Figure 1 should be operated at pressures between 5 and 20 atmospheres to give the best results, preferably about 10 atmospheres; however, higher or lower pressures may be used if desired.

It is apparent that many widely different embodiments of this invention may be made without departing from the spirit and scope thereof and therefore it is not intended to be limited except as indicated in the appended claims.

I claim:

1. A process for the separation of acetylene from admixture with gases more volatile than acetylene which comprises rectifying said mixture in the presence of ethylene so as to obtain a liquid ethylene-acetylene mixture and under conditions that will effect the separation of the acetylene from the ethylene, said rectification step being characterized in that the rectification system is put in condition to operate on the gaseous mixture to be separated by initial temporary operation on a gas feed of substantially the same composition as the acetylene-containing gas, except that the acetylene in said mixture is replaced with ethane, and then gradually changing the composition of the gas feed by replacing ethane with acetylene until the composition of the incoming gas is substantially the same as that of the acetylene-containing gas.

2. The process of starting a rectification system for the separation of acetylene from admixture with other gases which comprises starting the rectification system on a gas feed of substantially the same composition as the acetylene-containing gas except that the acetylene in said mixture is replaced with ethane, then gradually changing the feed gas composition to the acetylene-containing mixture.

3. The process of starting a rectifying column for the rectification of a mixture consisting of acetylene and components boiling below acetylene, which comprises adjusting the temperature in the condenser and calandria of the rectifying column so as to obtain the separation of the acetylene as a liquid and the lower boiling components as a gas, then admitting a gaseous mixture of substantially the same composition as the acetylene-containing gas except that the acetylene in said mixture is replaced with ethane, operating the column for sufficient length of time to establish rectifying conditions and then replacing the ethane in the incoming gas with acetylene until the composition of the incoming gas is substantially the same as that of the acetylene-containing gas, and substituting the acetylene-containing gas for the synthetically produced gaseous mixture.

4. The process which comprises cracking a hydrocarbon oil under conditions conducive for the formation of acetylene, contacting the cracked gaseous products with a hydrocarbon oil that is non-selective for the absorption of acetylene so as to remove the components less volatile than acetylene, subjecting at least a part of the hydrocarbon oil containing the dissolved components less volatile than acetylene to the cracking reaction and rectifying the resulting gaseous fraction of acetylene and components more volatile than acetylene in the presence of ethylene so as to obtain a liquid ethylene-acetylene mixture and under conditions that will effect the separation of the acetylene from the ethylene, said rectification step being characterized in that the rectification system is put in condition to operate on the gaseous mixture to be separated by initial temporary operation on a gas feed of substantially the same composition as the acetylene-containing gas, except that the acetylene in said mixture is replaced with ethane, and then gradually changing the composition of the gas feed by replacing ethane with acetylene until the composition of the incoming gas is substantially the same as that of the acetylene-containing gas.

GUY B. TAYLOR.